Dec. 29, 1936.   J. D. HALL   2,066,288
APPARATUS FOR MOLDING PIPES, PILLARS, AND OTHER
CYLINDRICAL FORMS IN PLASTIC MATERIALS
Filed Aug. 1, 1935   2 Sheets-Sheet 1
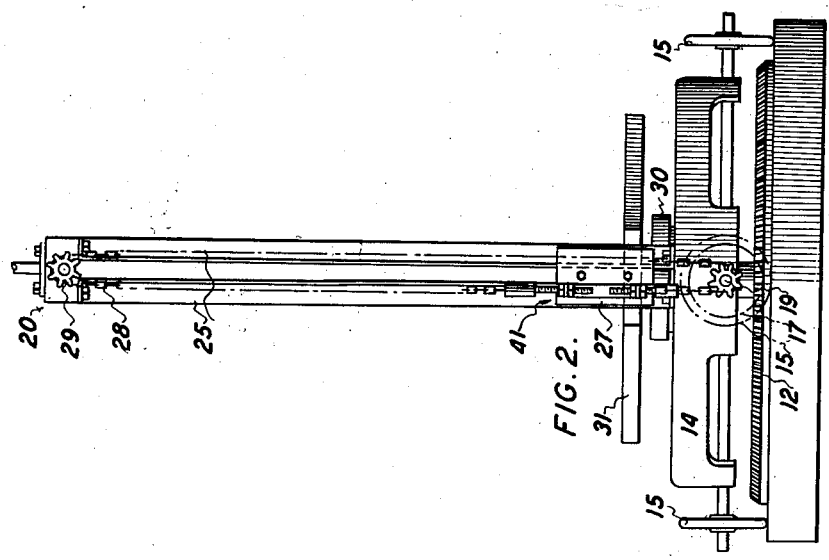
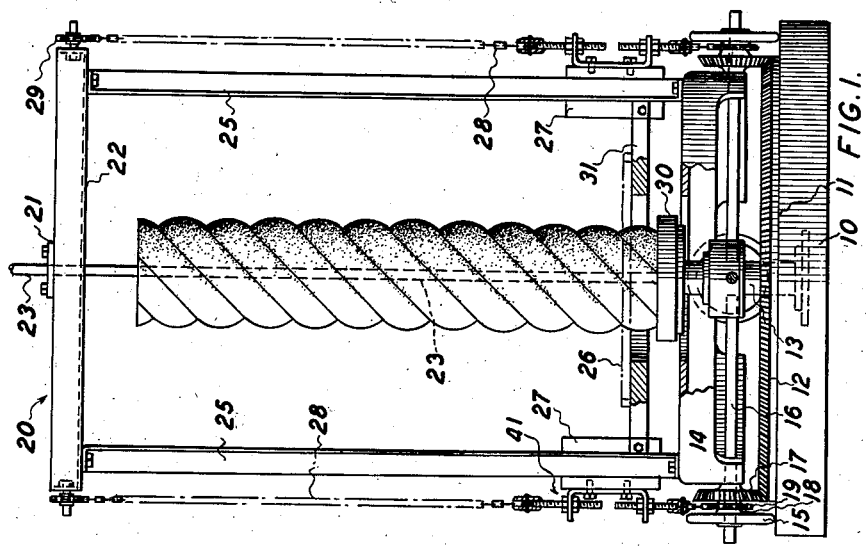
James Duncan Hall
INVENTOR
By Otto Munk
his ATT'y.

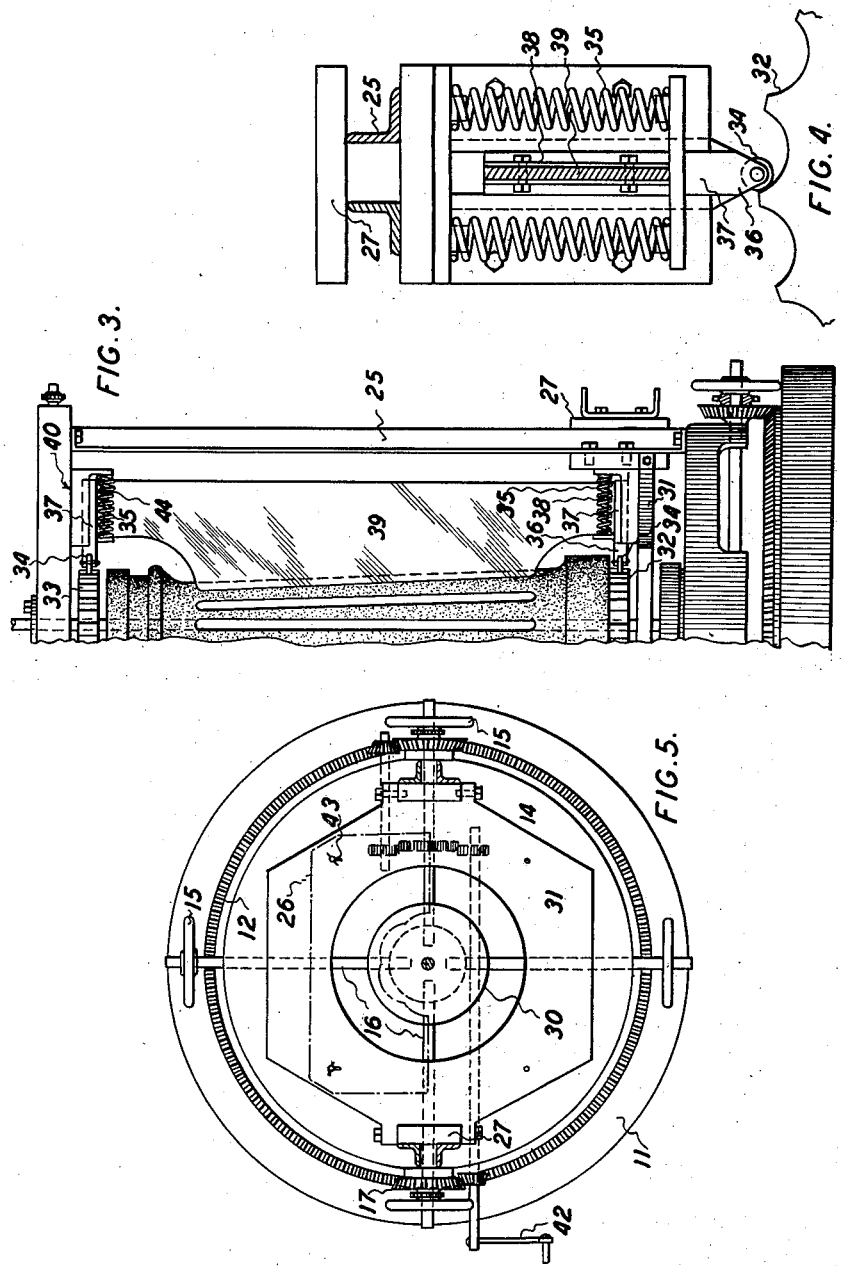

Patented Dec. 29, 1936

2,066,288

UNITED STATES PATENT OFFICE 2,066,288

APPARATUS FOR MOLDING PIPES, PILLARS, AND OTHER CYLINDRICAL FORMS IN PLASTIC MATERIALS

James Duncan Hall, Rockhampton, Queensland, Australia, assignor to J. D. Hall Plastic Columns Limited, Canberra, Australia, a company of Australia Application August 1, 1935, Serial No. 34,194
In Australia February 7, 1935

5 Claims. (Cl. 25—1)

This invention consists in a machine or apparatus which has been devised primarily for the construction and finishing of solid or hollow pillars and columns of large dimensions in situ in the erection of buildings. It includes devices for producing spiral fluting, bearings, and other features on the pillar shafts, and also bases and caps of architectural design integral with or adapted to be set under or upon the pillar shafts. It is applicable also for the molding of pipes.

The aforesaid articles are produced by operating on structural plastic material by stricklers which are carried in a frame which revolves on a vertical axis concentrically around the article in course of production. The frame is fitted with devices which cause the stricklers to be moved appropriately in radial direction and also vertically, to form flutings, moldings and other such features on the surface of the article in their revolving movement about it.

The great cost and the risk of injury involved in transporting heavy columns and pillars from the place where they are constructed to their position in a building is entirely avoided by constructing them in situ, as also is the incidental cost of renovating them in situ to make good injuries which may be caused in the course of transportation and erection.

Though the major object of the invention is to provide means for the construction of columns and other structure in situ, the apparatus may be utilized for production of these goods in a factory when their dimensions are such that they may be transported to the place of erection without great cost or risk of injury.

In the case of concrete pipes of large section the invention offers substantial advantages, as a more dense homogeneous structure is produced than is possible where the pipes are cast in a mold. It is not practicable to produce pipes or solid articles in plastic material by application of the plastic upon a core or mandrel rotated on a horizontal axis, as the plastic if sufficiently mobile to be shaped by rotation against a strickler would not have sufficient tenacity to retain its form and would be liable to sag and fall away from the core or mandrel.

In the accompanying explanatory drawings, Figs. 1 and 2 are vertical sectional elevational views of the apparatus or machine in planes respectively at right angles the one to the other, and arranged for the production of spirally fluted columns. Fig. 3 is a fragmentary vertical elevation of the apparatus as arranged for making columns having straight flutings with fillets. Fig. 4 is a plan to an enlarged scale of a copying plate and guide for strickling straight fluted columns as shown also in Fig. 3, and Fig. 5 is a plan of the lower part of the apparatus, applicable to Figs. 1 and 2, showing in dotted lines a half plan of a strickler for producing plain surface or helically reeded surface columns.

In Fig. 1 there is shown in course of construction a column of helically reeded shaft design, with circular base and cap. The range of designs which can be produced depends to some extent upon ingenious application by the workmen of the methods and mechanical elements of the apparatus or machine shown in the drawings and herein explained with reference thereto.

In all cases an appropriate core or mandrel is set up, and Portland cement mortar, Keene's cement, or other appropriate self setting plastic material is rendered over it by means of the stricklers which are revolved around it. If required, reinforcing wires may be bound in the structure intermediate the application of successive layers of plastic material. In the case of pipe construction especially, the advantages obtained by this facility are valuable, as reinforcement wires can be set taut and laid in quite concentrically and evenly spaced about the pipe axis, thus ensuring maximum utilization of the reinforcement. A similar observation applies to heavy capitals and salient moldings on pillars, which if not secured by metal reinforcements might be liable to weakness if they overhang adjacent parts of the structure to a substantial extent.

In Figs. 1 and 2, 10 is a base, 11 a smooth face circular track on the base 10, 12 a ring rack rail fixed down to the base 10 concentrically with the track 11, and 13 is a centre post fixed on the bed 10. The carriage 14 is borne on four smooth-rim wheels 15 by axles 16 fitted in the same plane and running on the track 11 round the centre 13. 17 are bevel pinions having bosses 18 to which also sprocket wheels 19 are keyed; these bosses are freely rotatable on the wheel axis 16.

20 is a demountable vertical frame; it is a rigid structure built on the carriage 14. 21 is a top bearing on a frame cross member 22 in axial alignment with the centre post 13, and 23 is a core or mandrel, shown as a rod, but in practice carrying upon it a frame which forms a mandrel or core support for plastic material, and dimensioned and shaped appropriately to the design of the column, pipe, or other structure to be produced. Thus in the case of the shaft of a column, or in the case of a pipe, it would be a cylindrical form so built that if required it may be taken apart and removed from the finished work, leaving a bore of desired section in the column, shaft, or pipe as the case may be. And in the case of bases or caps it would be built out to extend the cavity if so desired so as to avoid necessity for strickling on an excessive quantity of plaster to develop the required external contour.

Two or more vertical members 25 of the frame 20 are aligned and finished to form vertical guide rails. These members should be in symmetrical relation so as to maintain balance and prevent chattering of the strickler plates 26.

Strickler plates for helically reeding and fluting the column surface are made in halves as shown in chain dotted lines in Fig. 5, and are slotted at 43 for bolt holes to facilitate withdrawal from the work at the end of an operation, and return to the starting position. These plates are respectively fixed detachably on a work platform 31 which is supported by carriers 27 which are slidable on the guide members 25, and the carriers are connected for coincident movement by adjustable tensioning attachments 41 to the respective ends of chain belts 28 which run on the sprockets 19 and are reeved over and run on idler sprockets 29 on the head of the frame in proximity to the guide members 25. 30 is a non-rotating work support table fixed on the head of the centre post 13.

In operation, a core 23 having been set up and the strickler 26 being at the lower end of the traverse and adjusted to the correct operative position, the core or mandrel is rendered with plastic material. The frame as a whole is then rotated, preferably by means of the crank handle 42.

The rotation of the bevel pinions 17 effects the raising of the work platform 31, and the carriers 27 thereon up the guide members 25. The stricklers 26 are thus moved in a helical path so that they then form a helically fluted column, the pitch of the convolutions being determined by the relation between the gearing ratio and the rate of rotation of the strickler. When the platform reaches top position, the stricklers are retired by the length of the slotted holes 43 and the platform is then lowered to the restarting position by rotating the frame reversely. The column may thereafter be removed with its core and the core stripped out subsequently if so desired. By substitution of sprockets 19 of different sizes, the proportion between the vertical traverse of the stricklers and the rotational movement of the frame can be appropriately varied so that the stricklers can be caused to make their vertical traverse movement relatively fast or slow as required. Thus, it is made practicable to strickle column shafts in a helical direction, as, for instance, a column shaft as shown in Fig. 1, using stricklers shaped to the contour of the convolutions. In the case of bases and caps, and plain face columns, traverse movement of the stricklers is prevented by unshipping the chain belts. For plain face columns the arrangement shown in Fig. 3 is used.

In Figs. 3 and 4, the apparatus is shown in use for production of fluted, reeded, or segmental section columns. In this arrangement the chain belts 28 are removed, and the carriers 27 and work platform 31 are fixed to the vertical slide members 25. Circular guide plates 32 and 33 are attached concentrically to the ends of the column or its support above and below its working face, and the edges of these guide plates are notched or patterned to the required design. On the work platform 31 a guide roller 34 is held against the lower guide plate 32, being influenced radially inwards by springs 35 and the roller is supported in the forked end 36 of the slide 37. The top of the slide 37 has an attachment 38 for a strickle board 39. A similar sliding guide fitment is inverted and is provided at the upper part of the frame at 40, with means 44 for attaching the upper end of the strickle board 39 to it. As the frame 20 rotates, the guide rollers 34, influenced by the springs 35, follow the contours of the guide plates 32 and 33, and the attached strickle board 39 is reciprocated radially to shape the column.

What I claim as my invention and desire to secure by Letters Patent is:—

1. Apparatus for the purposes set forth comprising a circular smooth level trackway, a carriage rotatable in a horizontal plane about a fixed centre post at the track centre and supported on wheels running on said smooth trackway, means for rotating said carriage, a top support for a vertical core or mandrel adapted to support the work in progress and disposed co-axial with said fixed centre post, and stricklers mounted on a frame built on said carriage, said stricklers adapted to shape the external surface of a non-rotating body set up in a vertical axial position during rotational movement of the frame.

2. Apparatus for the purposes set forth comprising a circular smooth level trackway, and concentrically with said trackway a circular rack rail track, a carriage rotatable in a horizontal plane about a fixed centre post at the track's centre and supported on wheels running on said smooth trackway, one or a plurality of pinions each fixed to a sprocket wheel and centred at respectively different positions on the carriage structure and meshing with the rack rail track, a frame built on the carriage with a top support for a vertical core or mandrel which is footed on the centre post and is adapted to support the work in progress, said support co-axial with said frame, one or a plurality of vertical guides on said frame, strickler carriers slidable vertically on said guides, and a chain belt reeved over each said sprocket and over idler sprockets fitted on the upper part of the frame and terminally connected to said strickler carriers respectively in such a way that during rotation of the carriage the strickler carriers are caused to be traversed in vertical direction.

3. In combination with apparatus according to claim 1, a strickler made in a plurality of segments which together completely surround the face of a column, each said segment independently adjustable with respect to the frame.

4. Apparatus according to claim 1, in which the means for rotating the carriage comprise a circular rack rail track, a plurality of pinions centered at respectively different positions on the carriage structure and meshing with the said rail track, and operative means to revolve one or more of said pinions.

5. Apparatus according to claim 1 in which the stricklers are mounted on supports which are spring influenced inwards towards the frame axis and the strickler supports coact with the pattern plates fixed with respect to the work to move the stricklers transversely of the work so as to reproduce the contour of the said pattern plates on the face of the work whilst they are swept over it in the revolving movement of the frame.

JAMES DUNCAN HALL.